US008102148B2

(12) United States Patent
Hershey et al.

(10) Patent No.: US 8,102,148 B2
(45) Date of Patent: Jan. 24, 2012

(54) AUGMENTED DISTRIBUTION TRANSFORMER AND METHOD OF MAKING SAME

(75) Inventors: John Erik Hershey, Ballston Lake, NY (US); Michael James Hartman, Clifton Park, NY (US); Robert Dean King, Schenectady, NY (US); Richard Louis Zinser, Niskayuna, NY (US); John Anderson Fergus Ross, Niskayuna, NY (US); Michael Joseph Dell'Anno, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 112 days.

(21) Appl. No.: 12/751,098

(22) Filed: Mar. 31, 2010

(65) Prior Publication Data

US 2011/0241814 A1 Oct. 6, 2011

(51) Int. Cl.
*H02J 7/00* (2006.01)

(52) U.S. Cl. ........................................ 320/109

(58) Field of Classification Search .................... 336/65, 336/90, 92; 370/276; 320/107, 109
See application file for complete search history.

(56) References Cited

U.S. PATENT DOCUMENTS

| | | | | |
|---|---|---|---|---|
| 4,804,938 A * | 2/1989 | Rouse et al. | .................. | 370/276 |
| 7,327,134 B1 | 2/2008 | Weng et al. | | |
| 7,376,491 B2 | 5/2008 | Walling et al. | | |
| 7,599,161 B2 | 10/2009 | Premerlani et al. | | |
| 2002/0110310 A1* | 8/2002 | Kline | .............................. | 385/15 |
| 2009/0187358 A1* | 7/2009 | Deaver, Sr. | ...................... | 702/58 |
| 2009/0261779 A1* | 10/2009 | Zyren | ........................... | 320/109 |

* cited by examiner

*Primary Examiner* — Tuyen Nguyen
(74) *Attorney, Agent, or Firm* — Ziolkowski Patent Solutions Group, SC; Jean K. Testa

(57) ABSTRACT

A method, system, and apparatus including a distribution transformer having a communication module. The distribution transformer is configured to convert a first high voltage electricity from a high voltage distribution line to a first low voltage electricity and convert a second low voltage electricity from a low voltage power line to a second high voltage electricity. The communication module is programmed to provide time data representing time of day information along the low voltage power line to an electrical device and provide location data representing location information along the low voltage power line to the electrical device. The location information includes a geographic location of the distribution transformer.

22 Claims, 3 Drawing Sheets

AUGMENTED DISTRIBUTION TRANSFORMER AND METHOD OF MAKING SAME

BACKGROUND OF THE INVENTION

Embodiments of the invention relate generally to distribution transformers and, more particularly, to a distribution transformer capable of relaying information to one or more electrical devices.

Many "smart" devices have the capability to determine their geographic location and/or the local time. For example, geographic positioning system (GPS) devices or the like have the ability to calculate their geographic position from satellite or other wireless electromagnetic signals. Alternatively, or in addition thereto, an electrical device may rely on cell tower communications to determine its current location. Regardless of the techniques used (e.g., GPS communication, cell tower communication, or the like), such devices generally require specialized hardware and/or software to determine their position. This specialized hardware and/or software can add to the expense of such devices.

Similarly, many devices also have the ability to determine the local time. For example, a cable box converter may have the ability to determine the local time from a signal sent via a cable line. Other devices may have the ability to determine the local time from a satellite signal, cell tower signal, or the like. As with GPS-like devices, these devices also generally require specialized hardware or software to receive the time keeping signals.

With the advent of smart grids (i.e., electrical power grids having capabilities beyond the mere transfer of electricity), more and more uses of local time and/or geographic location information arise. For example, a device may rely on the local time for energy conservation and/or economic reasons. Take an electric device that has the capability to determine whether or not to consume electricity and/or sell electricity to an electric provider. Such a device may rely on the local time to make such a determination. If, for example, energy costs are at or near a maximum at a particular time of the day, the device may postpone electricity consumption to a different time of the day when costs are cheaper. Alternatively, the device may decide to initiate an energy transfer protocol to sell energy to the energy provider during peak consumption times. As such, time information can be utilized by a device to determine whether or not to consume electricity provided from an energy provider and/or to provide electricity to the energy provider.

Likewise, location information can also be of value. For example, for billing purposes, a utility can benefit from knowing the location of an electricity consuming devices or system.

Though location and time information can be valuable and/or helpful, many devices do not have the capability to determine or gather such information. There are devices capable of determining the local time and geographic location, but such capabilities often add cost to such devices.

It would therefore be desirable to provide an apparatus and method to cost effectively convey time and/or location information to one or more electrical devices.

BRIEF DESCRIPTION OF THE INVENTION

In accordance with one aspect of the invention, an apparatus including a distribution transformer having a communication module. The distribution transformer is configured to convert a first high voltage electricity from a high voltage distribution line to a first low voltage electricity and convert a second low voltage electricity from a low voltage power line to a second high voltage electricity. The communication module is programmed to provide time data representing time of day information along the low voltage power line to an electrical device and provide location data representing location information along the low voltage power line to the electrical device. The location information includes a geographic location of the distribution transformer.

In accordance with another aspect of the invention, a method of manufacturing a distribution transformer. The method includes assembling a distribution transformer capable of stepping down high voltage electricity from a high voltage distribution line and conveying stepped down electricity along a low voltage line to an electrical device, where the high voltage distribution line is configured to transfer a higher voltage electricity than the low voltage line. The method also includes assembling a communications module capable of conveying time of day information and geographic information along the low voltage line to the electrical device and coupling the communication module to the distribution transformer. The geographic information includes a geographic location of the distribution transformer.

In accordance with another aspect of the invention, an apparatus includes a distribution transformer having a communication module. The distribution transformer is configured to step down electricity received from a high voltage distribution power line, provide the stepped down electricity to an electrical device via a low voltage power line, step up electricity provided to the distribution transformer from the electrical device via the low voltage power line, and provide the stepped-up electricity to the high voltage distribution power line. The communication module is programmed to transmit a first data set representative of a geographic location of the distribution transformer to the electrical device via the low voltage power line and transmit a second data set representative of a time of day to the electrical device via the low voltage power line.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Electrical generation facilities or systems generally deliver high voltage electricity along distribution lines to residential and/or commercial customers. This high voltage electricity is often on the order of several kilovolts. Generally, at or near the point of consumption, the distribution line's high voltage energy is stepped down to a lower utility voltage energy by a step-down distribution transformer before the energy is conveyed to a consumer via one or more low voltage lines. Often, these distribution transformers are located many feet above ground on power poles, located outdoors in safety-shielded containers on a structural support slab on the ground, located underground, or located inside a building within a safety shielded enclosure.

In general, it is beneficial to minimize any voltage drop between the low voltage side of a distribution transformer and an electrical device receiving power from the distribution transformer. As such, since there is generally a voltage drop per linear distance unit along the low voltage line(s), distribution transformers are typically located as near the point of energy consumption as possible subject to regulation and economic constraints.

Since a distribution transformer is often located as near the point of energy consumption as possible considering the regulation and economic constraints, the location of the distribution transformer also provides a good approximation of an electrical device's location. That is, an electrical device connected to receive power from the distribution transformer is located near the distribution transformer. As such, according to an embodiment of the invention, a distribution transformer capable of providing time and/or location information is set forth.

Figure 1:
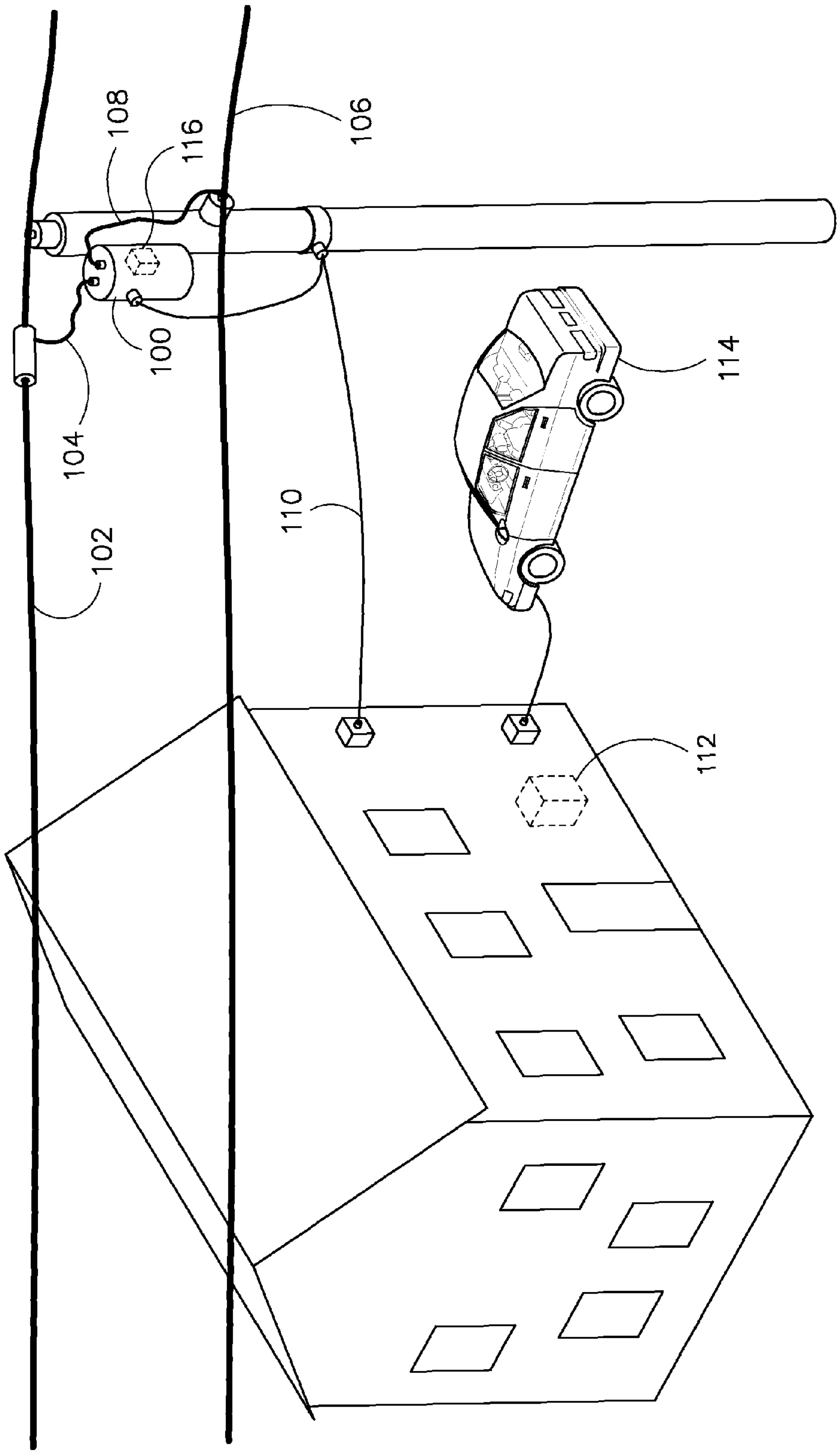
FIG. 1 is a block diagram of an augmented transformer according to an embodiment of the invention.

FIG. 1 is a block diagram of an augmented distribution transformer 100 according to an embodiment of the invention. Augmented distribution transformer 100 is coupled to a high voltage distribution line 102 via a first conductor 104 and is also coupled to a neutral line 106 via a second conductor 108. Augmented distribution transformer 100 is configured to step down high voltage electricity from high voltage distribution line 102 to a lower voltage electricity, which is passed along a low voltage line 110 to an electrical device 112 and/or other electrical devices such as a plug-in electric hybrid vehicle (PHEV) PHEV 114. In addition, augmented distribution transformer 100 is configured to step up electricity received from electrical device 112 or PHEV 114 via low voltage line 110 and provide the stepped up electricity to high voltage distribution line 102.

Though one low voltage line 110 is depicted in FIG. 1, it is contemplated that augmented distribution transformer 100 be configured to pass low voltage electricity along more than one low voltage line such as, for example, three low voltage lines (not shown) in a three-phase setting. Likewise, though only one high voltage distribution line 102 is shown, it is contemplated that augmented transformer 100 may be configured to receive high voltage electricity from more than one high voltage distribution line (not shown). For example, augmented distribution transformer 100 may be configured to receive high voltage electricity from three high voltage distribution lines in a three-phase setting.

Augmented distribution transformer 100 includes a communications module 116 that is configured to provide temporal information (e.g., local time) along low voltage lines 110 to electrical device 112 and PHEV 114. Communications module 116 is also configured to provide geographic information along low voltage line 110 to electrical device 112 and PHEV 114, where the geographic information includes the geographic location of augmented distribution transformer 100. Since it is likely that augmented distribution transformer 100 is within the proximity of electrical device 112 and PHEV 114, it is also likely that the geographic information serves as an approximation of the location of electrical device 112 and PHEV 114.

It is noted that electrical device 112 and PHEV 114 are merely exemplary electrical devices and that augmented distribution 100 transformer is capable of providing temporal and geographic information to a variety of electrical devices (not shown).

Electrical device 112 and/or PHEV 114 can use the temporal and geographic location for a variety of purposes. According to one example, electrical device 112 may be a clock or include a clock. As such, the temporal information can be used to set the clock to the local time once the clock is energized via low voltage line 110. Alternatively, electrical device 112 could simply be a display that has the ability to display the time information. Such a device need not have time keeping capabilities. As such, the time information would be provided by communication module 116 along low voltage line 110 to electrical device 112, and electrical device 112 would simply present a visual depiction of the time information. In contrast to many common clocks that require time keeping capabilities and related circuitry, electrical device 112 needs only the capability to display the received time information.

Like the clock display discussed above, DVD players, ovens, microwaves, refrigerators, or other devices that often include clocks could instead simply include a display, rather than a "clock" having time keeping capabilities. As such, manufacturing cost of these devices could be reduced.

As with the temporal or time information, it is contemplated that the geographic information could be used for a variety of purposes. For example, PHEV 114 may have the ability to utilize the geographic information. PHEV 114 may store the location information each time PHEV 114 receives a charge from an energy provider or each time PHEV 114 provides energy to an energy provider. The stored geographic information could then later be used to, for example, verify an energy provider credit or debit.

An exemplary scenario will be illustrative of a such a verification technique. For example, an owner of a PHEV (e.g., PHEV 114) that resides in the state of New York may travel to Texas for leisure or work. While in Texas, the owner may plug into an energy provider's grid via low voltage line(s) (e.g., low voltage line 110) and an augmented distribution transformer (e.g., augmented distribution transformer 100) to receive a charge. The PHEV then receives a charge and stores the received temporal and geographic information.

Later, the owner may receive a bill or invoice receipt detailing the cost of energy provided to the PHEV while in Texas. The owner can then access the stored geographic information and verify that indeed he was in Texas during the billing period and that his PHEV did receive a charge while there. Further, the owner can access the temporal information to determine how long the PHEV was in the charge state. By accessing the temporal and geographic information, a consumer or owner could determine whether or not the bill is accurate. Such a bill or invoice receipt could be inaccurate for several reasons. For example, the energy provider may have made a billing error. Alternatively, the identification information of the PHEV could have been "spoofed." That is, identification information of a PHEV could have been hijacked by a criminal and improperly used such that when the criminal charges his vehicle, the energy provider is "spoofed" into believing the PHEV belongs to another.

In yet another example, an energy provider can utilize geographic information to aid in load balancing. For example, several PHEVs in the same geographic region may be coupled to a utility via one or more augmented transformers. In such a scenario, before receiving charge, each PHEV would send identification information to the energy provider. In addition, each PHEV may send geographic location information received from the augmented transformer to the energy provider. By knowing the number of PHEVs accepting a charge in a particular region, the energy provider could then assess the load on particular augmented transformers or on regions of the utility grid. If it is determined that the a particular augmented transformer has reached capacity or that a portion of the "grid" has reached capacity, the energy provider may postpone the conveyance of energy to one or more PHEVs until the load has decreased.

Embodiments of the invention are not limited to the above-described clocks, clock displays, or PHEVs. That is, according to embodiments of the invention, the augmented transformer (e.g., augmented distribution transformer 100) is capable of conveying geographic and time information to any device capable of receiving such information. It is also noted that the augmented transformer is capable of conveying energy to multiple consumers.

Figure 2:
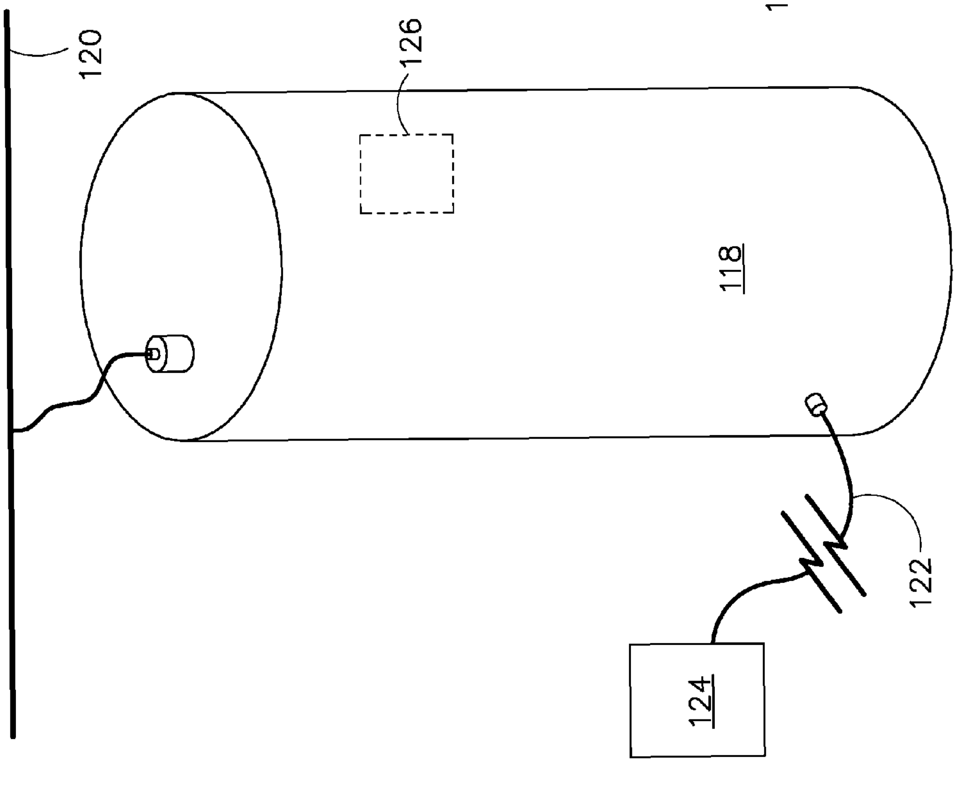
FIG. 2 is a block diagram of an augmented transformer according to another embodiment of the invention.

Referring now to FIG. 2, a block diagram of an augmented distribution transformer 118 is shown according to another embodiment of the invention. As with augmented distribution transformer 100 of FIG. 1, augmented distribution transformer 118 of FIG. 2 is configured to step down high voltage electricity from a high voltage distribution line 120 and provide a lower voltage electricity along a low voltage line 122 to an electrical device 124. Though high voltage distribution line 120 and low voltage line 122 are each respectively depicted as a single line, it is contemplated that high voltage distribution line 120 may represent multiple lines (e.g., three high voltage lines for three phases) and that low voltage line 122 may represent multiple lines.

It is also contemplated that augmented distribution transformer 118 may be configured to step up low voltage electricity from low voltage line 122 and provide a higher voltage electricity to high voltage distribution line 120.

Augmented distribution transformer 118 includes a communications module or system 126 configured to relay temporal and geographic information to electrical device 124. Though FIG. 2 only depicts one electrical device 124 coupled to augmented distribution transformer 118 via low voltage line 122, it is contemplated that augmented distribution transformer 118 be configured to pass temporal and geographic information to more than one electrical device coupled thereto via one or more low voltage lines (e.g., low voltage line 120). Further, electrical device 124 may merely be an intermediary between augmented transformer 118 and another electrical device (not shown) coupled to electrical device 124.

It is contemplated that communications module 126 may include one or more components or modules providing various types of functionality thereto. For example, referring also to FIG. 3, according to embodiments of the invention, communications module 126 includes a power line communication (PLC) module 128 configured to relay the local time and geographic information along low voltage line 122 to electrical device 124. It is contemplated that communications module 126 may also include other components or modules. For example, communications module 126 may include an antenna 130, an internet server 132, a GPS module 134, an authentication module 136, an encryption module 138, a memory module 140, a radiation detector 142, a diagnostic module 144, a processor 146, and/or a battery 148, where modules 130-148 are shown in phantom. Further details regarding the various components (i.e., modules or components 128-148) will be set forth below.

It is contemplated that PLC module 128 may be configured to provide the temporal and geographic information along low voltage line 122 to electrical device 124. In addition, it is contemplated that PLC 128 may be configured to maximize the efficiency of sending the temporal and geographic information along low voltage line 122 while minimizing inductive coupling between high voltage distribution line 120 and low voltage line 122. As such, PLC module 128 may be configured to reduce or eliminate the injection of noise into high voltage distribution line 120 during the conveyance of the temporal and geographic information.

According to another embodiment, it is contemplated that PLC module 128 is also configured to receive information sent along high voltage distribution line 120. For example, PLC module 128 may be configured to receive, via high voltage distribution line 120, temporal information, geographic information, and/or other information sent from an energy provider or another party. Further, PLC module 128 may be configured to provide information or data along high voltage distribution line 120 to an energy provider or another party (not shown).

Alternatively, or in addition thereto, it is contemplated that communications module or system 126 may include antenna 130 configured to receive the temporal and/or geographic location information that is to be provided to electrical device 124 via low voltage line 122. For example, by employing antenna 130, augmented distribution transformer 118 may receive the temporal and/or geographic information via cellular communication or another type of wireless electromagnetic communication. Upon receiving the temporal and/or geographic information via antenna 130, communications module 126 may provide such information to electrical device 124 via low voltage line 122.

As explained above, it is contemplated that communications module 126 may include internet server 132. It is contemplated that internet server 132 may be configured to provide a data transport access for augmented distribution transformer 118 using the Internet. Accordingly, augmented distribution transformer 118 may employ internet server 132 for messaging across the Internet. Such messaging could include the power line transport of data to an energy provider or another party (e.g., a consumer).

As discussed above, according to embodiments of the inventions, augmented distribution transformer 118 provides temporal and geographic location information along low voltage line 122. It is contemplated that communications module 126 includes global positioning system (GPS) module 134 configured to determine the geographic location of augmented distribution transformer 118. According to such an embodiment, GPS module 134 calculates the geographic information, and communications module 126 then sends the geographic location information along low voltage line 122 to electrical device 124. GPS module 134 may have the ability to calculate a global position from satellite signals or information relating thereto. It is contemplated that rather than employing GPS module 134 to determine the geographic location of augmented distribution transformer 118, communications module 126 may employ a LORAN or other type of device (not shown) to determine the geographic location of augmented distribution transformer 118.

If position errors are present in the geographic information calculated by GPS module 134, it is contemplated that GPS module 134 may also be configured to correct such errors. For example, GPS module 134 may have differential global positioning system (DGPS) capabilities. In such an embodiment, GPS module 134 may utilize a priori information pertaining to the location of augmented distribution transformer 118 to determine a position correction. That is, GPS module 134 may have its location pre-programmed therein. This pre-programmed information may then be compared to the global position calculated from satellite signals. A position correction may then be determined from the comparison. It is contemplated that augmented distribution transformer 118 may be configured to wirelessly broadcast the position correction information via antenna 130 to other devices (not shown). Accordingly, other devices (not shown) having GPS capabilities and within the proximity of augmented distribution transformer 118 may utilize the position correction information to correct for satellite signal errors.

As set forth above, communications module 126 of augmented distribution transformer 118 may also include authentication module 136. According to an embodiment of the invention, authentication module 136 is configured to authenticate communications sent between communications module 126 and electrical device 124. For example, authentication module 136 may be configured to require that electrical device 124 be identified prior to any exchange of energy. In such a scenario, electrical device 124 may authenticate itself to authentication module 136, and authentication module 136 could determine, via the authentication, whether or not electrical device 124 has permission to receive energy from augmented distribution transformer 118 and/or whether electrical device 124 has permission to provide energy to high voltage distribution line 120 via augmented distribution transformer 118. Augmented distribution transformer 118 may also, via authentication module 136, have the ability to determine what type of device electrical device 124 is via the identification sent along low voltage line 122. For example, authentication module 136 may determine that electrical device 124 is a dishwasher, PHEV, or a heating and cooling system.

Referring now to encryption module 138, in order to protect information or data sent between augmented transformer 118 and electrical device 124, encryption module 138 may be configured to ensure that such information or data is encrypted to address privacy issues. It is contemplated that encryption module 138 may also be configured to decrypt data received via low voltage line 122 or high voltage distribution line 120.

In addition to being configured to relay temporal and geographic information to electrical device 124 via low voltage line 110, it is contemplated that communications module 126 may also be configured to relay other types of information.

For example, communications module 126 may be configured to relay contractual information pertaining to the sale or purchase of energy. For example, electrical device 124 may be a PHEV, and communications module 126 may be configured to relay contractual information to PHEV along low voltage line 122 so that PHEV can determine whether or not to enter into a contractual relationship with an energy provider to purchase energy (i.e., receive a charge) therefrom or to sell energy thereto. A technique exemplifying the relay of such contractual information will be described below in detail with respect to FIG. 4.

Figure 3:
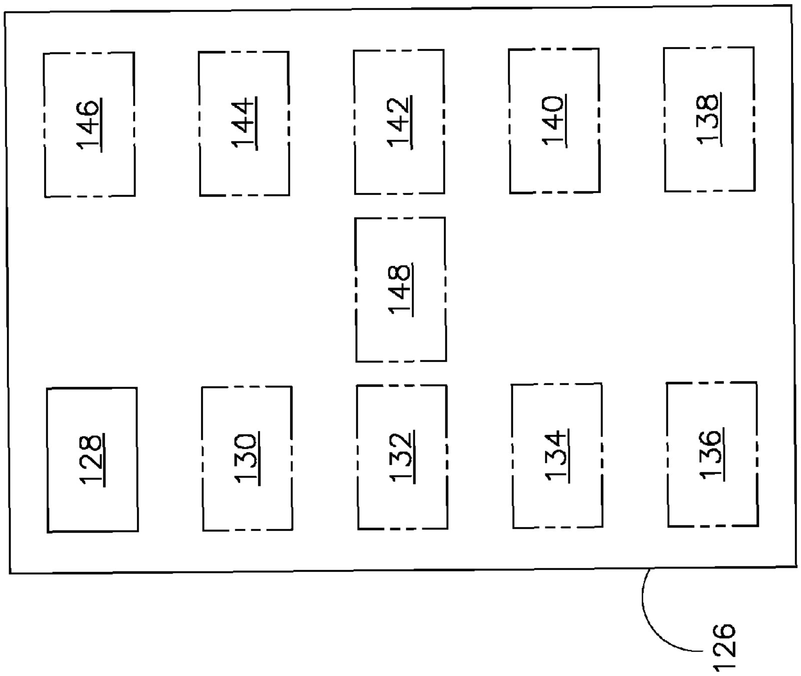
FIG. 3 is a block diagram of the communications module of FIG. 2 according to an embodiment of the invention.

Still referring to FIGS. 2 and 3, it is contemplated that communications module 126 also includes memory module 140, where memory module 140 is configured to store information. Memory module 140 may include one or more tangible data storage devices such as a magnetic drive, optical drive, integrated circuits, or other type of tangible computer readable storage media. The information stored in memory module 140 may include information representing, for example, the time at which electrical device 124 consumed electricity, a quantity of energy consumed by the electric device 124, the cost of the energy consumed from electrical device 124, the quantity of energy received by electrical device 124, information pertaining to the health of augmented distribution transformer 118, and/or an identification of electric device 124.

According to embodiments of the invention, augmented distribution transformer 118 also includes radiation detector 142. In such an embodiment, radiation detector 142 is configured to detect radiation and, if radiation is detected, relay notification of the detected radiation to a third party such as a national security agency. It is contemplated that either radiation detector 142 has the ability to relay such information or that communications module 126 relay such information. According to one embodiment, radiation detector 142 may be positioned at least partially within augmented distribution transformer 118, and according to another embodiment, it may be located externally on augmented distribution transformer 118. In either embodiment, augmented distribution transformer 118 would be configured in such a manner that would allow radiation to pass to radiation detector 142. For example, if radiation detector 142 were located within augmented transformer 118, augmented transformer 118 may include a "window" (not shown) that effectively allows radiation to pass to radiation detector 142.

As set forth above, it is contemplated that augmented distribution transformer 118 may include one or more of a variety of components (e.g., communications module 126, PLC module 128, antenna 130, internet server 132, GPS module 134, authentication module 136, encryption module 138, memory module 140, and radiation detector 142). To monitor the health of one or more of these components or modules, it is contemplated that augmented distribution transformer 118 may include diagnostic module 144. According to such an embodiment, diagnostic module 144 would be configured to monitor one or more of the components to determine a health status of those components monitored. The health status could then be relayed to a party of interest via, for example, PLC module 128 along high voltage distribution line 120 or by another means (e.g., wirelessly via antenna 130). Alternatively, or in addition thereto, diagnostic module 144 could store the health status information in a memory module such as memory module 140 for later retrieval and/or for back-up.

In addition to having the ability to monitor one or more of components 126-142, it is envisioned that diagnostic monitor 144 may also have the ability to assess the health status of other components or parts (not shown) of augmented transformer 118. For example, diagnostic module 144 may have the ability to monitor the windings (not shown) of augmented transformer 118 to assess the wear or load thereon. Additionally, or alternatively thereto, it is contemplated that diagnostic health module 144 may determine voltage, current, and/or power levels of augmented distribution transformer 118. Diagnostic module 144 may then determine if the voltage, current, and/or power levels exceed threshold level(s). If so, communication module 126 may send control information to the power distribution system or energy provider indicating that augmented distribution transformer 118 is operating at level(s) above threshold level(s). Such control information may be used, for example, to determine whether or not augmented distribution transformer 118 should be replaced with another augmented distribution transformer (not shown) having a greater operating capacity.

To power one or more of components 126-146, it is contemplated that augmented distribution transformer 118 may include battery 148, a rechargeable battery, and/or other capacitive device. Alternatively, or in addition thereto, one or more components 126-144 of augmented distribution transformer 118 may be powered by augmented distribution transformer 118 via electricity from high voltage distribution line 120. This electricity could either be in the high voltage form (prior to step down) or in a low voltage form (after step down). It is noted that it is contemplated that diagnostic module 144 could also be configured to assess the health or charge of battery 148 or the like. In such an embodiment, augmented distribution transformer 118 could either store the health status of battery 148 in memory module 140 and/or provide such health status information to a party of interest.

As discussed above, it is contemplated that communications module 126 may include a computer or processor 146. According to an embodiment of the invention, processor 146 aids in the control of components 128-144, 148. However, it is envisioned that, in addition to or alternatively, one or more components 128-144, 148 may include a processor (not shown) for control.

Figure 4:
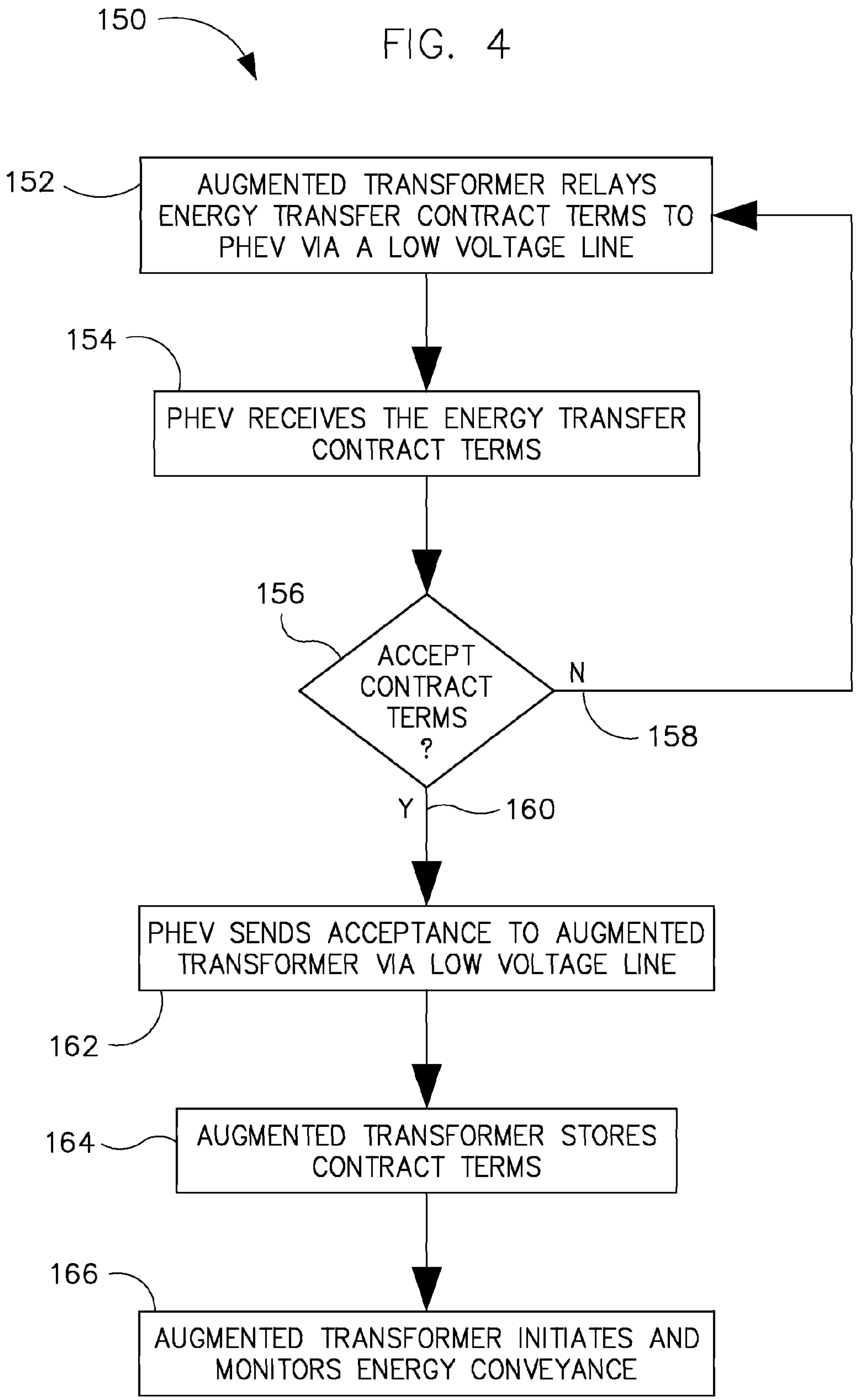
FIG. 4 is a flowchart of a technique for engaging in an energy transfer between an augmented transformer and an electric device according to an embodiment of the invention.

FIG. 4 is a flowchart of a technique 150 for obtaining contractual records pertaining to energy conveyance according to an embodiment of the invention. At block 152, an augmented transformer relays energy transfer contract terms to a PHEV via a low voltage line. It is contemplated that energy transfer contract terms include, for example, a credit per kilowatt-hour value, a debit per kilowatt-hour value, and/or time or date dependent rates. It is also contemplated that the energy transfer contract terms include an identification unique to the PHEV. At block 154, the PHEV receives the energy transfer contract terms from the augmented transformer via the low voltage line.

At block 156, the PHEV determines whether to accept or decline the energy transfer contract terms. If the PHEV decides to decline the energy transfer contract terms 158, process control proceeds back to block 152.

On the other hand, if the PHEV accepts the energy transfer contract terms 160, the PHEV sends an energy transfer request to the augmented transformer at block 162. At block 164, the augmented transformer saves the contract terms in a computer readable storage medium (e.g., memory module 140 of FIG. 3) and/or conveys the contract terms to a third party. At block 166 of FIG. 4, the augmented transformer initiates and monitors the energy transfer. It is noted that the energy transfer may pertain to the PHEV either receiving energy via the augmented transformer (i.e., receive a charge) or to the PHEV providing energy to a high voltage line via augmented transformer. In either scenario, as the augmented transformer monitors the energy transfer, it is contemplated that the augmented transformer save a record of the energy transfer to a computer readable storage medium and/or transfer that information to a third party.

Since the contract terms may include an identification unique to the PHEV, the contract terms along with the record of the energy transfer may be used to bill the owner or user for energy consumed. Alternatively, if the PHEV provides electricity rather than receives electricity, the contract terms along with the record of energy transfer may be used by a third party to provide a credit to the owner or user of the PHEV.

Though technique 150 has been described in terms of a PHEV and an augmented transformer, it is contemplated that technique 150 be equally applicable in a scenario where another type of electric device, other than a PHEV, is employed. For example, rather than a PHEV, a home or residence could be may be outfitted or retrofitted with an electrical device that negotiates energy conveyance terms with the augmented transformer. In such an embodiment, the contract terms and record of energy conveyance could be used to "bill" the home owner or resident or to provide the home owner or resident a credit.

Therefore, according to one embodiment of the invention, an apparatus including a distribution transformer having a communication module. The distribution transformer is configured to convert a first high voltage electricity from a high voltage distribution line to a first low voltage electricity and convert a second low voltage electricity from a low voltage power line to a second high voltage electricity. The communication module is programmed to provide time data representing time of day information along the low voltage power line to an electrical device and provide location data representing location information along the low voltage power line to the electrical device. The location information includes a geographic location of the distribution transformer.

According to another embodiment of the invention, a method of manufacturing a distribution transformer. The method includes assembling a distribution transformer capable of stepping down high voltage electricity from a high voltage distribution line and conveying stepped down electricity along a low voltage line to an electrical device, where the high voltage distribution line is configured to transfer a higher voltage electricity than the low voltage line. The method also includes assembling a communications module capable of conveying time of day information and geographic information along the low voltage line to the electrical device and coupling the communication module to the distribution transformer. The geographic information includes a geographic location of the distribution transformer.

According to another embodiment of the invention, an apparatus includes a distribution transformer having a communication module. The distribution transformer is configured to step down electricity received from a high voltage distribution power line, provide the stepped down electricity to an electrical device via a low voltage power line, step up electricity provided to the distribution transformer from the electrical device via the low voltage power line, and provide the stepped-up electricity to the high voltage distribution power line. The communication module is programmed to transmit a first data set representative of a geographic location of the distribution transformer to the electrical device via the low voltage power line and transmit a second data set representative of a time of day to the electrical device via the low voltage power line.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:

a distribution transformer configured to:

convert a first high voltage electricity from a high voltage distribution line to a first low voltage electricity; and convert a second low voltage electricity from a low voltage power line to a second high voltage electricity; and wherein the distribution transformer comprises a communication module programmed to:

provide time data representing time of day information along the low voltage power line to an electrical device; and provide location data representing location information along the low voltage power line to the electrical device, wherein the location information includes a geographic location of the distribution transformer.

2. The apparatus of claim 1 wherein the distribution transformer further comprises a memory module, and wherein the distribution transformer is further configured to:

provide energy contract terms to the electrical device via the low voltage power line, wherein the energy contract terms comprise at least one of energy sale terms and energy purchase terms;

receive executed energy contract terms from the electrical device via the low voltage electrical line, wherein the executed energy contract terms comprise an agreement to the energy contract terms; and store the executed energy contract terms on the memory module.

3. The apparatus of claim 2 wherein the distribution transformer is further configured to:

request that the electrical device authenticate itself;

encrypt data sent from the distribution transformer; and encrypt data received by the distribution transformer.

4. The apparatus of claim 2 wherein the distribution transformer is further configured to store, on the memory module, at least one of a data set representing a quantity of energy provided to the electrical device and a data set representing a quantity of energy received from the electrical device.

5. The apparatus of claim 1 wherein the distribution transformer further comprises a global positioning module configured to determine a geographic location of the distribution transformer from signals transmitted via a plurality of global positioning satellites.

6. The apparatus of claim 1 wherein the distribution transformer further comprises an antenna configured to receive data representative of at least one of the time of day information and the geographic location.

7. The apparatus of claim 1 wherein the distribution transformer further comprises a radiation sensor configured to detect nuclear radiation.

8. The apparatus of claim 1 wherein the distribution transformer further comprises an internet server configured to relay data across the Internet.

9. The apparatus of claim 1 wherein in the communications module comprises a power line communication (PLC) module, and wherein the PLC module is configured to receive at least one of the time of day information and the geographic information from the high voltage distribution line.

10. A method of manufacturing a distribution transformer comprising:

assembling a distribution transformer capable of stepping down high voltage electricity from a high voltage distribution line and conveying stepped down electricity along a low voltage line to an electrical device, wherein the high voltage distribution line is configured to transfer a higher voltage electricity than the low voltage line;

assembling a communications module capable of conveying time of day information and geographic information along the low voltage line to the electrical device, wherein the geographic information comprises a geographic location of the distribution transformer; and coupling the communication module to the distribution transformer.

11. The method of claim 10 wherein assembling the communications module comprises assembling a power line communications (PLC) module capable of conveying the time of day information and the geographic information along the low voltage line to the electrical device.

12. The method of claim 11 wherein the PLC module is:

capable of sending information received from the electrical device to a party of interest via the high voltage distribution line; and capable of receiving at least one of the local time information and the geographic information from the high voltage distribution line.

13. The method of claim 10 further comprising installing a global positioning device to the distribution transformer, wherein the global positioning device is capable of calculating the geographic information.

14. An apparatus comprising:

a distribution transformer configured to:

step down electricity received from a high voltage distribution power line;

provide the stepped down electricity to an electrical device via a low voltage power line;

step up electricity provided to the distribution transformer from the electrical device via the low voltage power line; and provide the stepped-up electricity to the high voltage distribution power line; and wherein the distribution transformer comprises a communication module programmed to:

transmit a first data set representative of a geographic location of the distribution transformer to the electrical device via the low voltage power line; and transmit a second data set representative of a time of day to the electrical device via the low voltage power line.

15. The apparatus of claim 14 wherein the communications module is configured to receive data sent from the electrical device via the low voltage line.

16. The apparatus of claim 15 wherein the distribution transformer further comprises an encryption module configured to encrypt the data sent to the communications module from the electrical device.

17. The apparatus of claim 14 wherein the distribution transformer further comprises an authentication module configured to verify an identity of the electrical device.

18. The apparatus of claim 14 wherein the distribution transformer further comprises a diagnostic module configured to assess a performance of the distribution transformer.

19. The apparatus of claim 14 wherein the distribution transformer further comprises a battery configured to power at least one component of the distribution transformer.

20. The apparatus of claim 14 wherein the communication module comprises a power line communication (PLC) module configured to transmit the first and second data sets along the low voltage power line.

21. The apparatus of claim 20 wherein the PLC module is further configured to receive at least one of the first data set and the second data set from the high voltage distribution power line.

22. The apparatus of claim 14 wherein the communication module is further programmed to wirelessly transmit global positioning correction information receivable by one or more global positioning devices.

* * * * *